(No Model.) 2 Sheets—Sheet 1.
G. P. GANSTER.
APPARATUS FOR WINDING CLOCKS BY AIR CURRENTS.
No. 286,418. Patented Oct. 9, 1883.
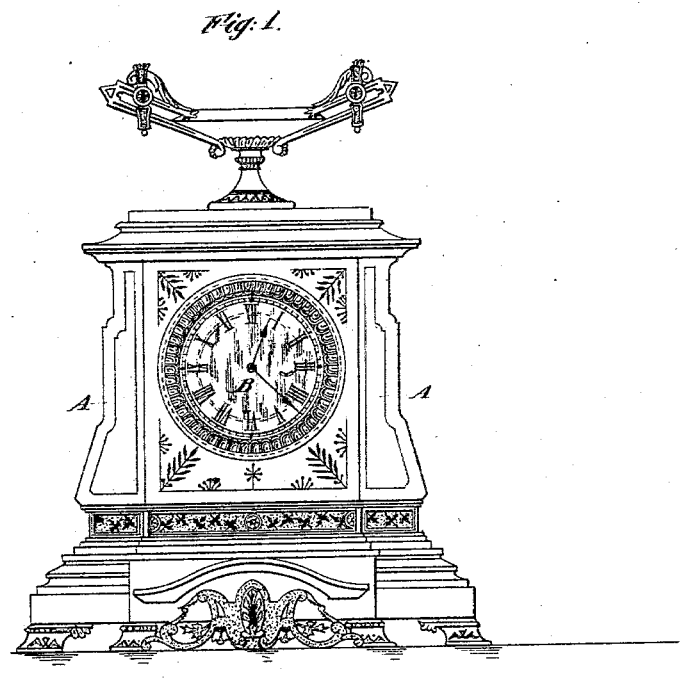
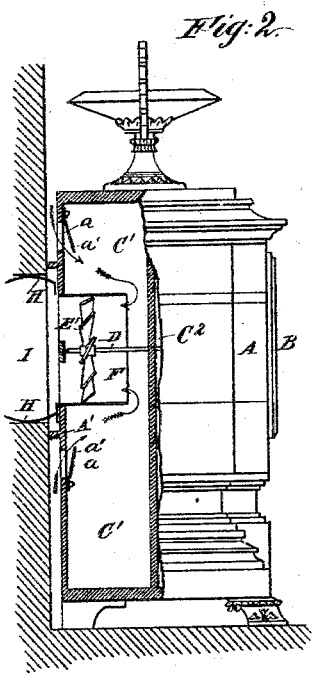
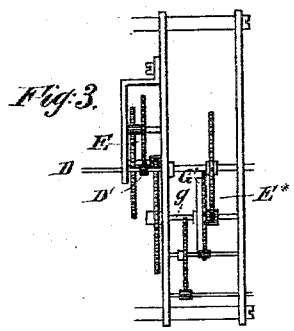
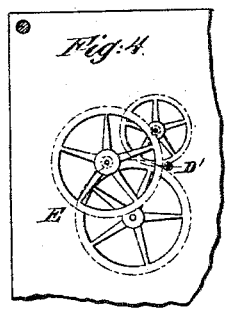
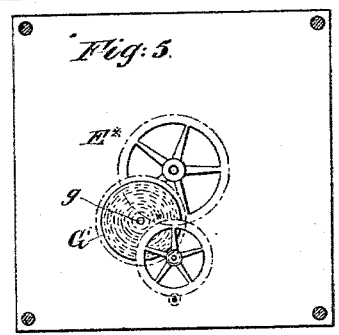
Witnesses:
Charles W. Searle
A. H. Gartner
Inventor:
George P. Ganster
By his attorney
Thomas D. Stetson (No Model.) 2 Sheets—Sheet 2.

G. P. GANSTER.
APPARATUS FOR WINDING CLOCKS BY AIR CURRENTS.

No. 286,418. Patented Oct. 9, 1883.

Witnesses: Fig. 11. Inventor:

UNITED STATES PATENT OFFICE.

GEORGE P. GANSTER, OF READING, PENNSYLVANIA.

APPARATUS FOR WINDING CLOCKS BY AIR-CURRENTS.

SPECIFICATION forming part of Letters Patent No. 286,418, dated October 9, 1883.

Application filed February 12, 1883. (No model.)

*To all whom it may concern:*

Be it known that I, GEORGE P. GANSTER, of Reading, Berks county, in the State of Pennsylvania, have invented certain new and useful Improvements in Clocks; and I do hereby declare that the following is a full, clear, and exact description of the same.

I make what I term a "ventilating-clock," connected with an orifice opening into the chimney of the apartment, so conditioned that a constant current of air shall flow from the room into the chimney, thereby ventilating the room, and, by mechanism actuated by the gentle current, keeping the clock constantly wound up. The orifice into the chimney should be made in proper relation to the mantel. The clock stands upon the mantel, and its wind-wheel receives the current of air through apertures distributed so as to make the action very uniform. I provide self-acting valves, which close and prevent a back-draft of air under any circumstances. A spring keeps stored a sufficient amount of power to run the clock for a considerable period if there was a temporary stoppage of the wind-wheel. I find, however, that there is in ordinary chimneys a sufficient draft to maintain the action of the clock summer and winter absolutely constant. I provide a light screw-wheel, adapted to be revolved by a gentle current of air, and place it in such connection with an orifice in the chimney that the draft of air which flows continuously into the chimney through this orifice will give it a constant revolving motion. This wheel is suitably connected to a train of gearing, which gives a continued motion to the mechanism of the clock by its revolving action. There have been various attempts made to accomplish this end, but the arrangements of the mechanism have been defective, necessitating much expense, which my invention avoids.

The accompanying drawings form a part of this specification, and represent what I consider the best means of carrying out the invention.

Figure 6:
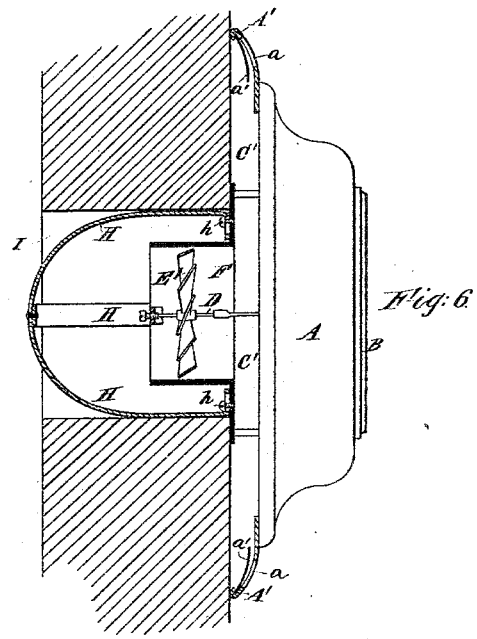
Figure 7:
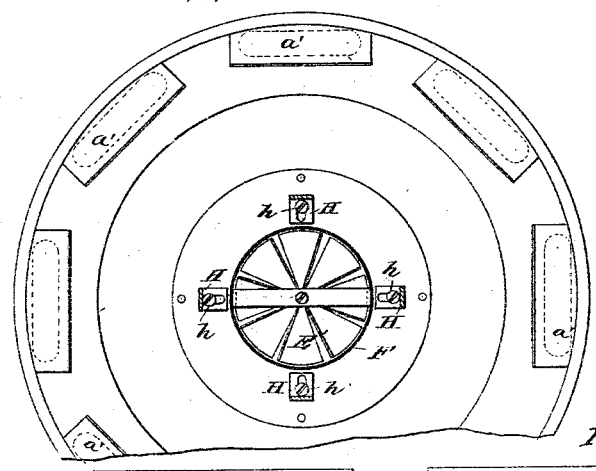
Figure 8:
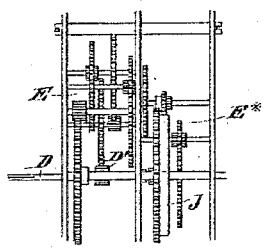
Figure 9:
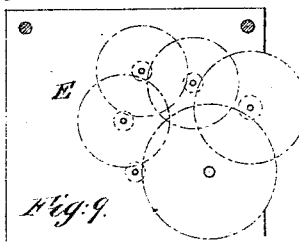
Figure 10:
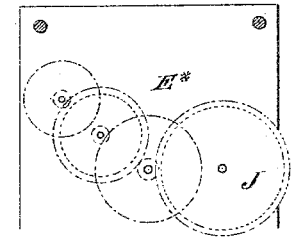

Figure 1 is a front view; Fig. 2, a side view, partly in section. This also shows a portion of the wall of the apartment and of the mantel on which the clock is supported. Figs. 3, 4, and 5 represent portions only of the mechanism. Fig. 3 is an edge view of the wheel-work which effects the constant winding by the action of the wind-wheel, being shown on the left side of the central partition and the clock mechanism proper being on the right side thereof. Fig. 4 is a rear view, showing the winding mechanism alone. Fig. 5 is a rear view of the clock mechanism alone. Figs. 6 and 7 represent a modification. Fig. 6 is a side elevation, partly in section. Fig. 7 is a rear view. Figs. 8, 9, and 10 represent the more complex construction of the mechanism. In this form there is a spring capable of storing power sufficient to run the clock for a day or more. Fig. 8 is an edge view of the entire wheel-work. Fig. 9 is a rear view of the winding-train alone. Fig. 10 is a rear view of the clock-train alone. Fig. 11 is a vertical section through the spring and its inclosing barrel. It shows the spring firmly engaged with the spindle, while it is connected with the barrel only by friction induced against the interior of the latter.

Similar letters of reference indicate corresponding parts in all the figures.

A is the outside casing or frame-work of the clock, equipped in the usual manner, with the ordinary face-dial and hands B, and having legs resting on the mantel. The works of the clock are in two separate divisions, C' and C². The clock-works proper constitute the division C², and may be ordinary clock mechanism. The winding-shaft D extends through both divisions of the works, and connects the two. On the same, within the division C', a gear-wheel, D', is firmly mounted. This gear-wheel rotates by means of the system or train of gears E. (Shown in Figs. 3, 4, and 5.) This gear-wheel receives its motion through the action of the screw-wheel E', which is mounted firmly on the spindle D.

F is a short tube of sheet metal, preferably brass, open at both ends, with a cross-bar at its rear extremity supporting the rear end of the spindle. The rear or back of the clock, the part next the chimney, is formed with a bell-shaped flange or lip, A', as shown clearly in Fig. 6, which, when pressed against the wall of the apartment adjacent to the chimney-orifice I, incloses a large space or air-chamber. In the lip are a number of air-passages or apertures, a, covered on the inside with pliable leather valves a', which prevent any return current under any circumstances, and also protect the wheel from irregular gusts. A moderate current of air is drawn inward through the openings a, distributed in the chamber C', and causes it to keep the wheel E' continually revolving with the effect to keep the mainspring continually wound up. It is important to keep the wheel E' continuously revolving, for the reason, among others, that it takes more current of air to start it after stopping than to keep it continously moving. I provide an ordinary slip joint, (not shown,) so that when the spring has been fully wound up the revolution of the wheel may continue, and the winding-spindle D still turn, the grip of the mainspring not being sufficient to resist its action and that of the wheel.

The mainspring G, which is housed within the barrel G', is firmly attached to the spindle g, but only grips the barrel G' sufficiently tight to keep a gentle hold upon it, slipping to allow for overwinding. It serves to keep the works of the clock always "wound up," so that in case the draft of air is not sufficiently strong to give motion to the wheel the clock will continue to work for some length of time till the draft becomes stronger and the wheel again sets in motion.

It is important to the support of an ornamental clock substantially made and possessing the weight essential to a proper decorative device that the clock shall rest upon a firm support. Long custom and good taste have established the center of a mantel as a desirable place for an ornamental clock. I do not deem it practicable to support such a device in the stove-pipe holes, which are frequently formed at a higher elevation in the walls of apartments; but I believe it expedient to aid in steadying the clock by taking a gentle hold in the interior of the hole specially formed for the purpose. This is effected by the anchors H. These are made of hard brass or other material adapted to endure the conditions, being arranged crosswise and riveted together at the junction. The ends of each are turned inward, and each receives a screw, h, which stands in a slot, as shown, and allows for adjustment outward and inward within moderate limits. The anchors are made with a slight swell or outward bend near the points of fastening, as shown, so that the clock, having the anchors attached and rightly adjusted, on being brought into position and thrust backward against the wall with a little force, is secured by these anchors in the chimney-hole, said anchors aiding to insure the correct position of the clock relatively to the hole and to steady the clock against any subsequent displacement by any force. The adjustment by means of the screws h should be such as to compel the anchors to brace firmly against the inside of the hole. The adjustment allows changes within sufficient limits, due to accidental inequalities in the size of the hole.

Figs. 6 and 7 show the anchors differently proportioned. These figures also show the tube F and its inclosed wind-wheel thrust into the chimney-space. This modification contains only a portion of the invention, the legs being dispensed with, and consequently the heavy decorative work proper for a mantel-clock should be omitted in this form of construction.

The spring G, mounted on the spindle g, and constantly wound by the working of the wind-wheel and its connected gearing, performs an important function in storing a sufficient amount of power to run the clock for an hour or more, while the wind-wheel may be stopped. I can, if desired in any case, increase the quantity of gearing, and by providing a stiffer and longer spring store sufficient power to run the clock for a day or a week. Such an arrangement is shown in Figs. 9 and 10. I do not esteem such generally desirable. On the contrary, I prefer for economy and simplicity to reduce the amount of gearing as far as practicable. The power required to run a clock is very slight. The wind-wheel must run easily, as it is not capable, with the slight current acting on it, of overcoming any great resistance. The draft through the hole I will usually give a considerable excess of motion to the wind-wheel. This will be allowed for by the slipping of the spring G around on the smooth interior of the barrel G'.

The chamber C' may be made to merely bear against the wall and sufficiently large to cover the orifice I, as shown particularly in Fig. 2.

The provision for allowing a constant current of air into the chimney through the valved orifices in my clock tends to improve the sanitary condition of the dwellings or other buildings in which they may be used. It insures that, independent of other means for ventilating, there shall always be a slight and gentle but reliable current of air flowing from the apartment into the chimney through the clock. In the possible case of the absence of such ventilation for any long period the clock gives warning of the fact by stopping.

In adjusting the clock to match the hole in the wall the screws h are slackened, and the anchors are adjusted outward and inward, as required, and the screws h h again tightened. The adjustment should be such that the elasticity of the anchors will be brought into play to a moderate extent when the clock is forced backward against the wall of the apartment and the anchors are received in the orifice I.

Modifications may be made in the forms and proportions without departing from the main features of my invention. More or less gears may be employed to suit differing circumstances, or where the draft is stronger or weaker the gearing may be modified accordingly.

Parts of the invention may be used without the whole.

I can make the light form of clock shown in Fig. 6 with more thickness from front to rear, and have the wind-wheel E' and its tube F inclosed within the clock the same as in Fig.

2. I can aid in supporting the light clock by a nail, screw, or other ordinary fastening above, thus hanging the clock in front of the hole, the anchors H serving to steady it in the correct position; or I can make the heavy mantel-clock shown in Figs. 1 and 2 with the wind-wheel E' and its inclosing-tube F projecting out into the chimney. In such case the rear chamber of the clock may be greatly contracted or entirely dispensed with.

I propose in some cases to employ a spring, J, of sufficient length and stiffness to store a power sufficient to run the clock for a day or more, employing suitable trains of gearing E E* to adjust the action thereto; but for ordinary use I prefer the simpler mechanism shown, having the barrel G' mounted on the third wheel of the clock mechanism E*, as shown.

The features of importance upon which I rely for novelty are specifically pointed out in the claims.

I claim as my invention—

1. In a ventilating-clock substantially as described, the spring-anchor H, having means for adjustment upon the rear face of the clock-frame, as and for the purposes set forth.

2. In combination with the clock-frame, the spring-anchor H, having means, as shown, for adjusting the same at will, the wind-wheel E', and the valves $a'$, as and for the purposes set forth.

3. In a ventilating-clock substantially as described, the chamber C', having valves $a'$, the wind-wheel E', and the winding mechanism, said mechanism being separated from the air-passage C' by a closed partition, through which the shaft D works, as set forth.

In testimony whereof I have hereunto set my hand, at New York city, this 9th day of February, 1883, in the presence of two subscribing witnesses.

GEORGE P. GANSTER.

Witnesses:
H. A. JOHNSTONE,
B. E. D. STAFFORD.